United States Patent [19]

Boland et al.

[11] Patent Number: 5,826,079
[45] Date of Patent: Oct. 20, 1998

[54] METHOD FOR IMPROVING THE EXECUTION EFFICIENCY OF FREQUENTLY COMMUNICATING PROCESSES UTILIZING AFFINITY PROCESS SCHEDULING BY IDENTIFYING AND ASSIGNING THE FREQUENTLY COMMUNICATING PROCESSES TO THE SAME PROCESSOR

[75] Inventors: Vernon K. Boland, Lexington; Kevin R. Brasche, Irmo; Kenneth A. Smith, Prosperity, all of S.C.

[73] Assignee: NCR Corporation, Dayton, Ohio

[21] Appl. No.: 676,045

[22] Filed: Jul. 5, 1996

[51] Int. Cl.$^6$ .................................................. G06F 9/00
[52] U.S. Cl. ........................ 395/672; 395/673; 395/678
[58] Field of Search .................................. 395/672, 673, 395/674, 678, 676, 704, 672 T; 364/222.81, 222.82

[56] References Cited

U.S. PATENT DOCUMENTS

| 5,257,372 | 10/1993 | Furtney et al. | 395/650 |
| 5,287,508 | 2/1994 | Hejna, Jr. et al. | 395/650 |
| 5,325,526 | 6/1994 | Cameron et al. | 395/650 |
| 5,379,428 | 1/1995 | Belo | 395/650 |
| 5,506,987 | 4/1996 | Abramson et al. | 395/650 |

*Primary Examiner*—Majid A. Banankhah
*Attorney, Agent, or Firm*—James M. Stover; Charlene Stukenborg

[57] ABSTRACT

A method for assigning processes to processors within a multi-processor computer system employing a sleep/wakeup facility whereby a first process requiring information from a second process is placed into a "sleep" state by said computer system until said second process is able to provide said required information, said first process thereupon being awakened by said computer system so that said first process may continue processing with the required information. The method comprising the steps of identifying a pair of processes which frequently exchange wakeup requests, and assigning the processes within the pair of processes to the same processor within the multi-processor computer system for execution. To identify frequently communicating processes, the method of the present invention maintains a record of each "wakeup" request issued by the computer system, the record including: an identification of the process on whose behalf said wakeup request is issued; and an identification of the process to which said wakeup request is issued. The records are periodically examined to determine a count of the number of wakeup requests between pairs of processors. Should the number of wakeup requests between two processors exceed a predetermined threshold, those two processors are assigned to the same processor within the multi-processor computer system for execution.

8 Claims, 6 Drawing Sheets

METHOD FOR IMPROVING THE EXECUTION EFFICIENCY OF FREQUENTLY COMMUNICATING PROCESSES UTILIZING AFFINITY PROCESS SCHEDULING BY IDENTIFYING AND ASSIGNING THE FREQUENTLY COMMUNICATING PROCESSES TO THE SAME PROCESSOR

The present invention relates to Symmetric Multi-Processing (SMP) systems and, more particularly, to a method for improving the execution efficiency of frequently communicating processes within an SMP system utilizing affinity process scheduling.

BACKGROUND OF THE INVENTION

In Symmetric Multi-Processor (SMP) operating systems, many processes frequently communicate with other processes through a sleep/wakeup facility whereby a process in need of information will be placed into a "sleep" state by the operating system until another process is able to provide the required information. When this information becomes available, the operating system will "wakeup" the sleeping process so that it may continue processing with the provided information.

An example of such a communicating mechanism would be a reading and writing process communicating over a UNIX "pipe". Depending on process priorities and the algorithm employed by the system process scheduler, the two processes may be run on different processors, introducing a significant amount of overhead due to locking and cache inefficiencies. Locking inefficiencies arise from the two processes concurrently attempting to access the same lock structure employed to protect the data to be communicated. These concurrent accesses are not only non-productive for the process that did not obtain the lock, but may also cause the memory location containing the lock data to be "thrashed" over the memory bus of the SMP system. Cache inefficiencies arise because the information required by the sleeping process must be first written into the processor cache memory associated with the writing process, and thereafter transferred over the system bus into the cache memory associated with the processor cache memory associated with the reading process.

Many SMP systems also employ scheduling mechanisms whereby long-running processes continue to run on the same processor so that their working set of data and text will remain in a single processor's cache. When a process migrates from one processor to another, it must re-load its working set of text from main memory (provided that they are not already resident in the new processor's cache) and it must transfer its working set of modified data from the old processor's cache into the new processor's cache. These loading and transfer operations can be very time consuming depending on the amount of data to be transferred, the bandwidth and utilization of the processor-memory bus, and the access latency of main memory.

In order to minimize process migration between processors, the process scheduler can be enhanced to give individual processes "affinity" to a particular processor. One such method of scheduling processes is disclosed in U.S. Pat. No. 5,185,861 to Valencia, issued Feb. 9, 1993, and entitled "Cache Affinity Scheduler". In that patent, an affinity scheduler for a multi-processor computer system is disclosed. The affinity scheduler allocates processors to processes and schedules the processes to run based upon the bases of priority and processor availability. The scheduler uses the estimated amount of cache context to decide which run queue a process is to be enqueued. U.S. Pat. No. 5,185,861 is hereby incorporated by reference.

In order to ensure a uniform distribution of processes to processor's, traditional affinity schedulers utilize three load-balancing techniques:

1. New processes are placed on a global run queue. Since all processor's periodically check the global queue, the processors that are more idle will tend to check the global queue more often, achieving load balancing for new processes.
2. Processes that have not run on a given processor for some period of time are "aged" via some tunable metric (such as number of context switches or clock ticks since the time the process was last run). When the age of a process exceeds some threshold, the process loses its affinity to that processor, since it is assumed that its working set of text and data have been replaced by those of other processes. In this case, the process is put back on the global queue when it is ready to run again.
3. Dynamic loading problems are detected by periodically examining the run queue lengths of each processor and stealing processes from processors having run queue lengths significantly greater than the average, system wide run queue length.

The utilization of an affinity process scheduler wherein processes are assigned to processors as described above may complicate efforts to eliminate the locking and cache inefficiencies associated with a sleep/wakeup facility. A method for reducing locking and cache inefficiencies in an SMP system employing a sleep/wakeup facility together with an affinity process scheduler is desired.

OBJECTS OF THE INVENTION

It is therefore an object of the present invention to provide a new and useful mechanism for improving the execution efficiency of frequently communicating processes within an SMP system.

It is another object of the present invention to provide such a mechanism which affinitizes frequently communicating processes to the same processor or processor node.

It is yet another object of the present invention to provide a new and useful affinity process scheduler for a multiprocessor computer system.

It is still a further object of the present invention to provide such an affinity process scheduler which affinitizes frequently communicating processes to the same Processor or processor node.

It is also an object of the present invention to provide a new and useful sleep/wakeup facility for a multiprocessor system which assigns communicating processes to the same processor or processor node to eliminate locking and cache inefficiencies normally resulting from the use of a sleep/wakeup facility.

SUMMARY OF THE INVENTION

There is provided, in accordance with the present invention, a method for assigning processes to processors within a multi-processor computer system employing a sleep/wakeup facility whereby a first process requiring information from a second process is placed into a "sleep" state by said computer system until said second process is able to provide said required information, said first process thereupon being awakened by said computer system so that said first process may continue processing with the required information. The method comprising the steps of identifying a pair of processes which frequently exchange wakeup requests, and assigning the processes within the pair of processes to the same processor within the multi-processor computer system for execution.

In the described embodiment, the method of the present invention maintains a record of each "wakeup" request issued by the computer system, the record including: an identification of the process on whose behalf said wakeup request is issued; and an identification of the process to which said wakeup request is issued. The records are periodically examined to determine a count of the number of wakeup requests between pairs of processors. Should the number of wakeup requests between two processors exceed a predetermined threshold, those two processors are assigned to the same processor within the multi-processor computer system for execution.

The above and other objects, features, and advantages of the present invention will become apparent from the following description and the attached drawings.

DETAILED DESCRIPTION OF THE PREFERRED EMBODIMENT

Figure 1:
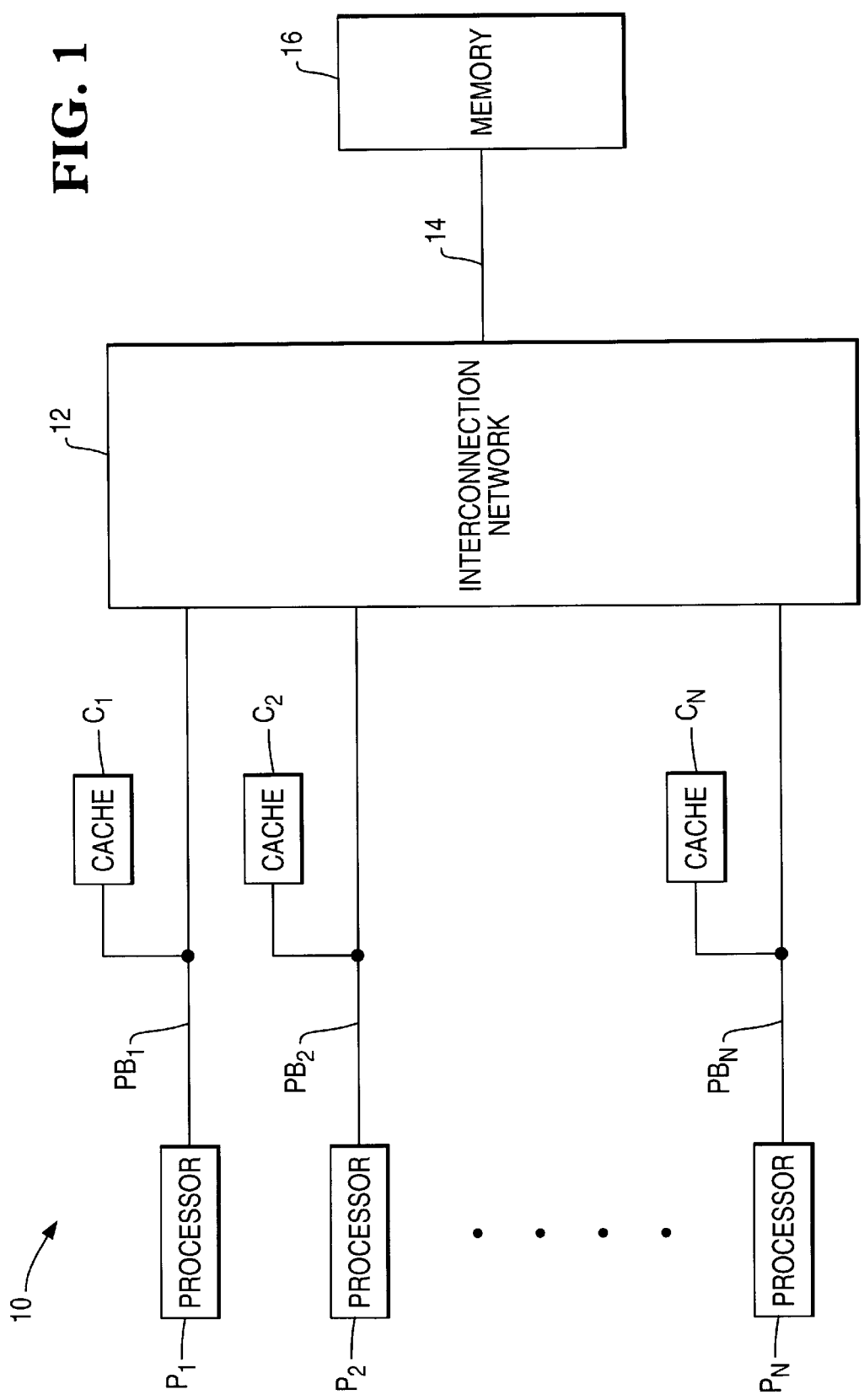
FIG. 1 is a simplified block diagram of a computer system having P processors.

Referring now to FIG. 1, a representative computer system 10 having multiple processors $P_1$ through $P_N$ and employing a process affinity scheduling system is shown. Each of the processors $P_1$ through $P_N$ has a respective cache memory $C_1$ through $C_N$ attached thereto. Each of the processors $P_1$ through $P_N$ is connect via a respective processor bus $PB_1$ through $PB_N$ to a system interconnect network 12, for example a parallel system bus. The interconnect network 12 is also connected to a common system memory 16 via a memory bus 14. The common memory 16 may be accessed by any of the processors $P_1$ through $P_N$ via the interconnect network 12.

The advantages offered by the use of cache memories to improve system speed, allowing processors to operate effectively at the faster speed of the cache memory rather than at the slower speed of a conventional DRAM main memory, are well known. A cache memory provides information to its associated processor faster than main memory, thus improving read cycles. Write cycles are also improved as a cache memory receives information from its associated processor at a fast rate, allowing the processor to continue processing while the cache independently processes the write to main memory as needed. The use of cache memories within a multi-processor system, however, provides additional advantages. System performance is improved through more efficient utilization of the memory or system buses. Traffic on the memory bus is reduced. Each data read and write operation need not involve main memory, rather data can be exchanged between the cache and main memory when convenient through the execution of burst cycles.

The system 10, unless preventive measures are taken, will be prone to random process migration.

Figure 2:
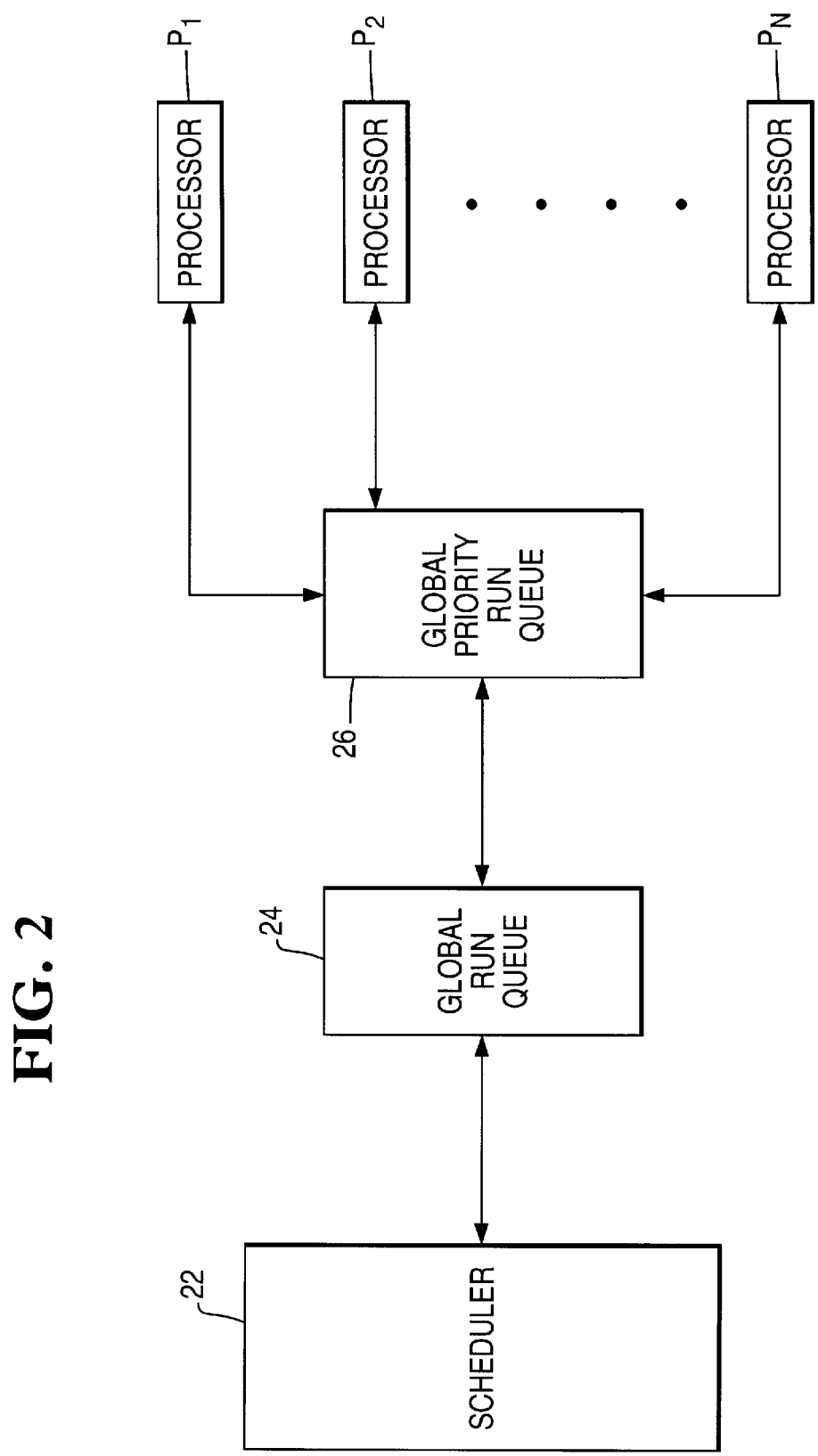
FIG. 2 is a simplified block diagram illustrating the major elements of an affinity scheduler utilized within a multiprocessor system, such as the system of FIG. 1.

A block diagram illustrating the major elements of an affinity scheduler utilized within a multiprocessor system, such as the system described above, is provided in FIG. 2. Scheduler 22 schedules all runnable processes in global run queue 24, including new processes as well as processes which have been previously run and are now affinitized to a specific processor. These processes may thereafter be reordered based upon process priority within a global priority run queue 26. Within priority levels processes are placed in a first-in-first-out (FIFO) order.

During operation, each processor, when it becomes available, will consult the global priority run queue 26 to determine which process it will next execute. One known affinity scheduling procedure for determining process execution is illustrated in the flow diagram of FIG. 3.

Figure 3:
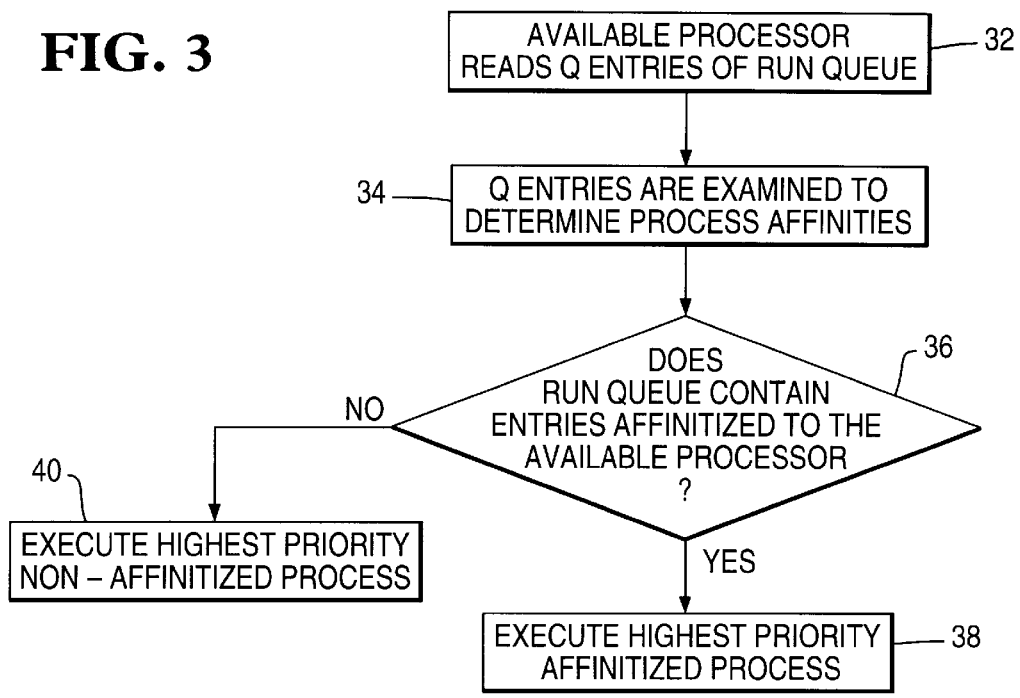
FIG. 3 is a flow diagram showing a method of operating an affinity scheduler without application of the present invention.

Referring now to FIG. 3, as a processor $P_1$–$P_N$ becomes available to receive and execute another process, it reads the queue entries contained within global priority run queue 26 (step 32). Each previously executed process entered into the global priority run contains information identifying the processor to which the process is affinitized. The queue entries read during step 32 are examined to identify processes affinitized to the available processor (step 34). If one or more of the entries read from the run queue is determined to be affinitized to the available processor then the highest priority entry identified as affinitized to the processor will be executed by that processor (steps 36 and 38). If no entries are determined to be affinitized to the processor then the highest priority non-affinitized process identified in run queue 26 will be executed (steps 36 and 40). This highest priority non-affinitized process may be a new process or a process affinitized to another processor, in which case the process will yield its affinity to the other processor and be "stolen" by the available processor.

The present invention provides an enhanced affinity scheduler having the ability to detect process pairs that are communicating frequently. This is accomplished by code in the class-specific wakeup routines employed within the operating system. For the case of two processes communicating over a pipe, when the operating system is executing the class-specific wakeup code on behalf of a "writing" process, a record is maintained of the processor to which the process to be awakened is affinitized. If it is determined that a process affinitized to a first processor "X" has consecutively awakened a process on a second processor "Y" a given number of times, the scheduler will be informed that it would be more efficient to move the affinity of the sleeping process from processor Y to processor X.

Figure 4:
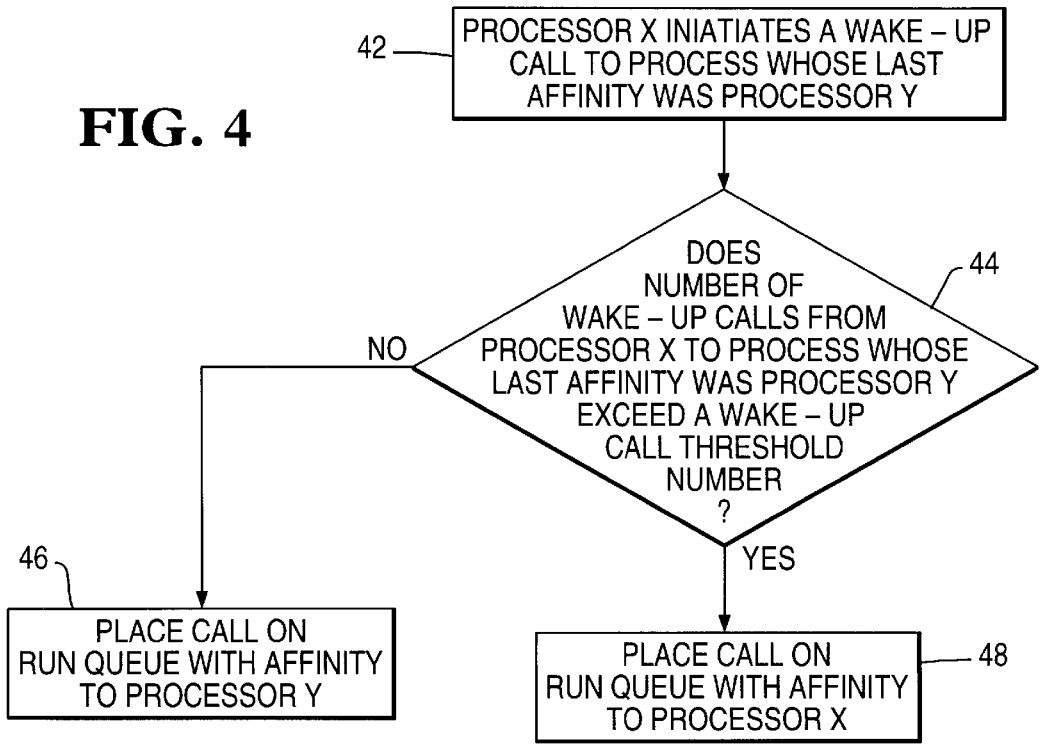
FIG. 4. a flow diagram showing a method for affinitizing frequently communicating processes to the same processor within a multiprocessing systems in accordance with the present invention.

The routine described immediately above is illustrated in the flow chart of FIG. 4. This routine is incorporated into the sleep/wakeup and process affinity scheduling procedures of the SMP operating system to reassign process and processor affinities to reduce locking and cache inefficiencies normally resulting from the use of a typical sleep/wakeup facility. Pseudo-code employed to accomplish this function is shown below:

---
Wakeup Monitoring Routine
---

```
class_specific_wakeup(process) {
    /* if process to wake up is not already affinitized to me*/
        if (process->affinity_cpu != my_cpu){
        /* if last CPU to wake up this process was not me OR if the last
         * CPU it was scheduled to run on is not equal to the one it is
         * currently affinitized to THEN reset the logic that counts
         * consecutive wakeups
         */
    if ((process->last_waker != my_cpu) ||
        (process->last_cpu_scheduled != process->affinity_cpu)) {
            process->last_waker = my_cpu;
            process->last_cpu_scheduled = process->affinity_cpu;
            process->match_count = 0;
        }
    /* Otherwise, we have a match. If the number of consecutive
     * matches is above a threshold, then move the sleeping process'
     * affinity to processor of the waker
     */
    else if ((process->match_count>MATCH_THRESHOLD) &&
        cpu_not_too_busy()) {
            process->last_cpu_scheduled = my_cpu;
            process->affinity_cpu = my_cpu;
        }
    /* Still have a match, but not enough consecutive matches,
     * increment match-count
     */
    else
        process->match_count++;
}
add_to_run_queue(process);
}/* end of class_specific_wakeup() */
```

Figure 5:
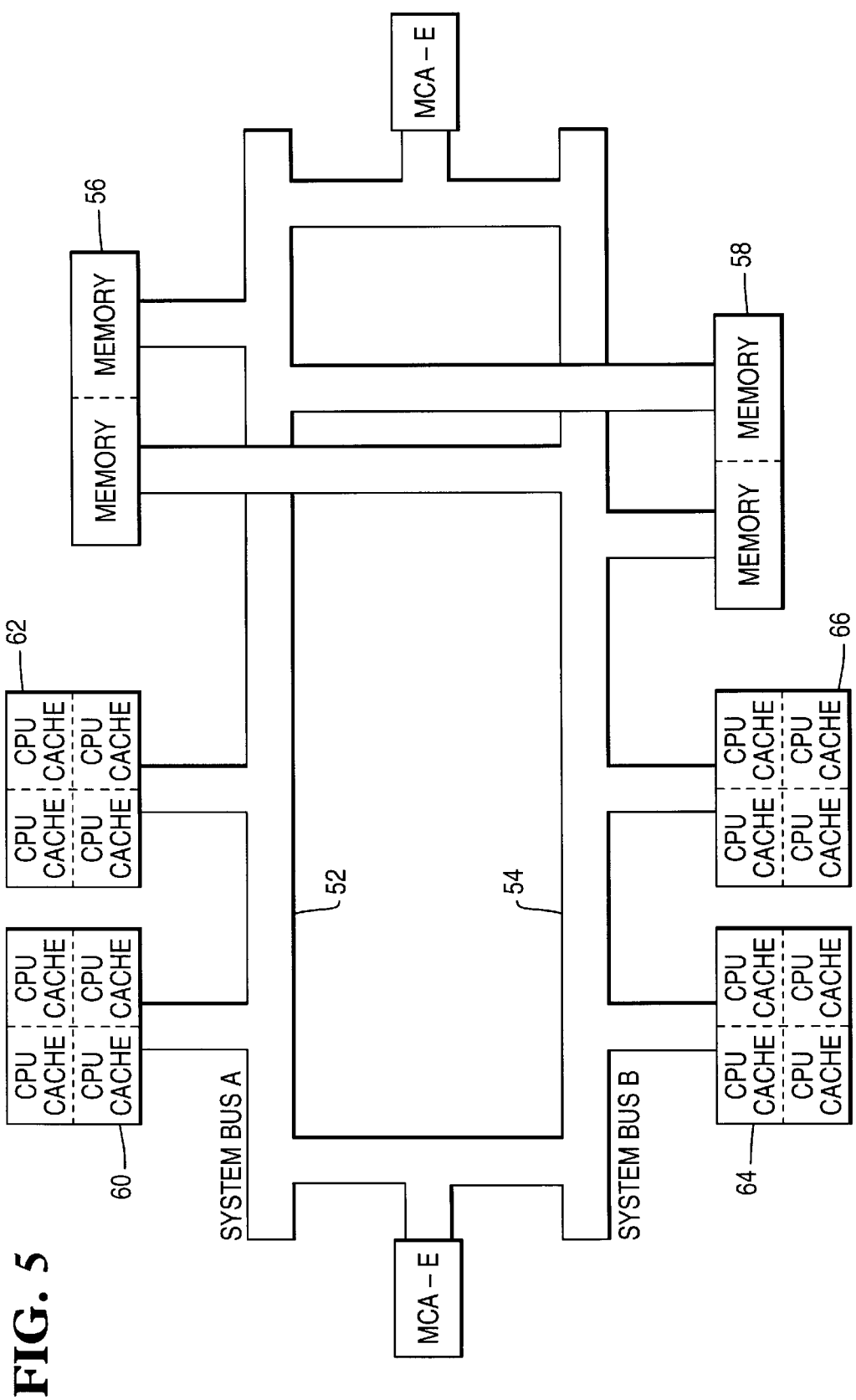
FIG. 5 is a block diagram representation of a scaleable system architecture including multiple processor nodes, each node containing multiple processors.

A more complicated multiprocessor architecture to which the above described invention may also be applied is shown in FIG. 5. Referring now to FIG. 5, there is seen a multi-processor system architecture employing dual split-transaction memory or system busses 52 and 54, two dual-ported system memory modules 56 and 58 connected between the two system busses, two processor boards 60 and 62 connected to system bus 52, and two processor boards 64 and 66 connected to system bus 54. In the architecture shown in FIG. 5, each one of processor boards 60, 62, 64 and 66, referred to herein as Quad boards, contains four processors as shown in FIG. 6.

The processors on processor board 60, identified by reference numerals 601, 602, 603 and 604, are interconnected through a data pathway called a disconnect bus 606, used exclusively for inter-processor communication. This bus is also called a nodal-bus, or n-bus. From the perspective of the system busses 52 and 54, each Quad board resembles a single processor attached to one of the dual system buses.

Figure 6:
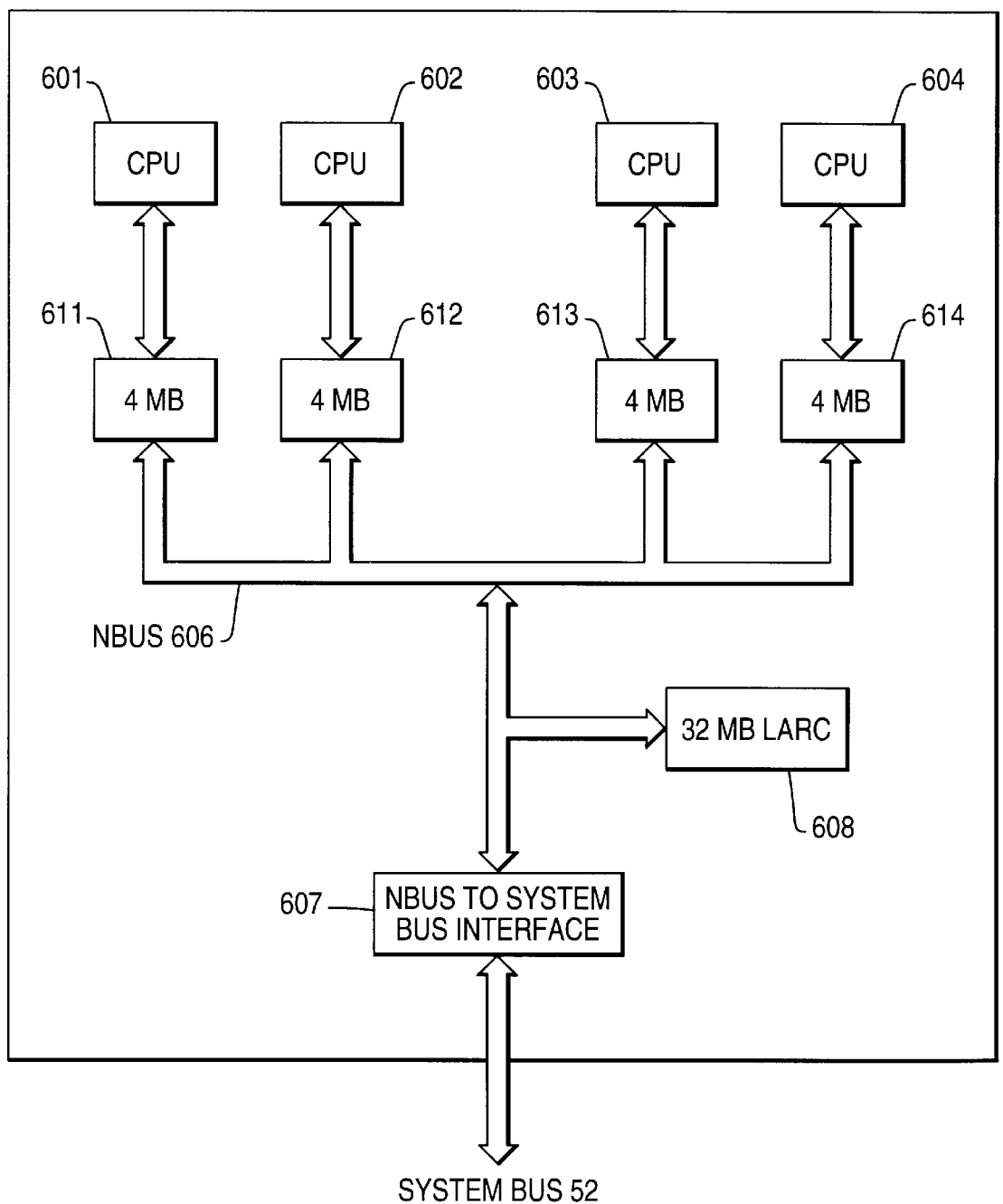
FIG. 6 is a block diagram representation of the architecture included in one of the processor nodes shown in FIG. 6.

In addition to an internal first level cache included within each processor, an external second level cache memory, shown in FIG. 6 as having a size of 4 megabytes and identified by reference numerals 611, 612, 613 and 614, is associated with each of processors 601, 602, 603 and 604, respectively.

Within each Quad board, the four processors use a bus snooping protocol on the n-bus. Bus snooping is a method of keeping track of data movements between processors and memory. There are performance advantages to this system with a small number of tightly-coupled processors. If a processor needs data that is available in the cache of another processor on the same Quad board, the data can be shared by both processors. Otherwise, the data must be retrieved from main memory, a more time consuming operation which requires system bus traffic. This method enhances system performance by reducing system bus contention.

To store heavily used sections of system memory, such as the operating system kernel and database executable files, a Limited Address Range Cache (LARC) 608 is sharable among all four processors on a Quad board. The operating system can command the LARC to map any read from designated address ranges in main system memories 56 and 58. These addresses, once fetched, are cached into LARC memory 608 and most likely do not ever need to be re-fetched from memories 56 and 58. This architecture reduces traffic on the system bus and effectively increases the system bus bandwidth.

Figure 7:
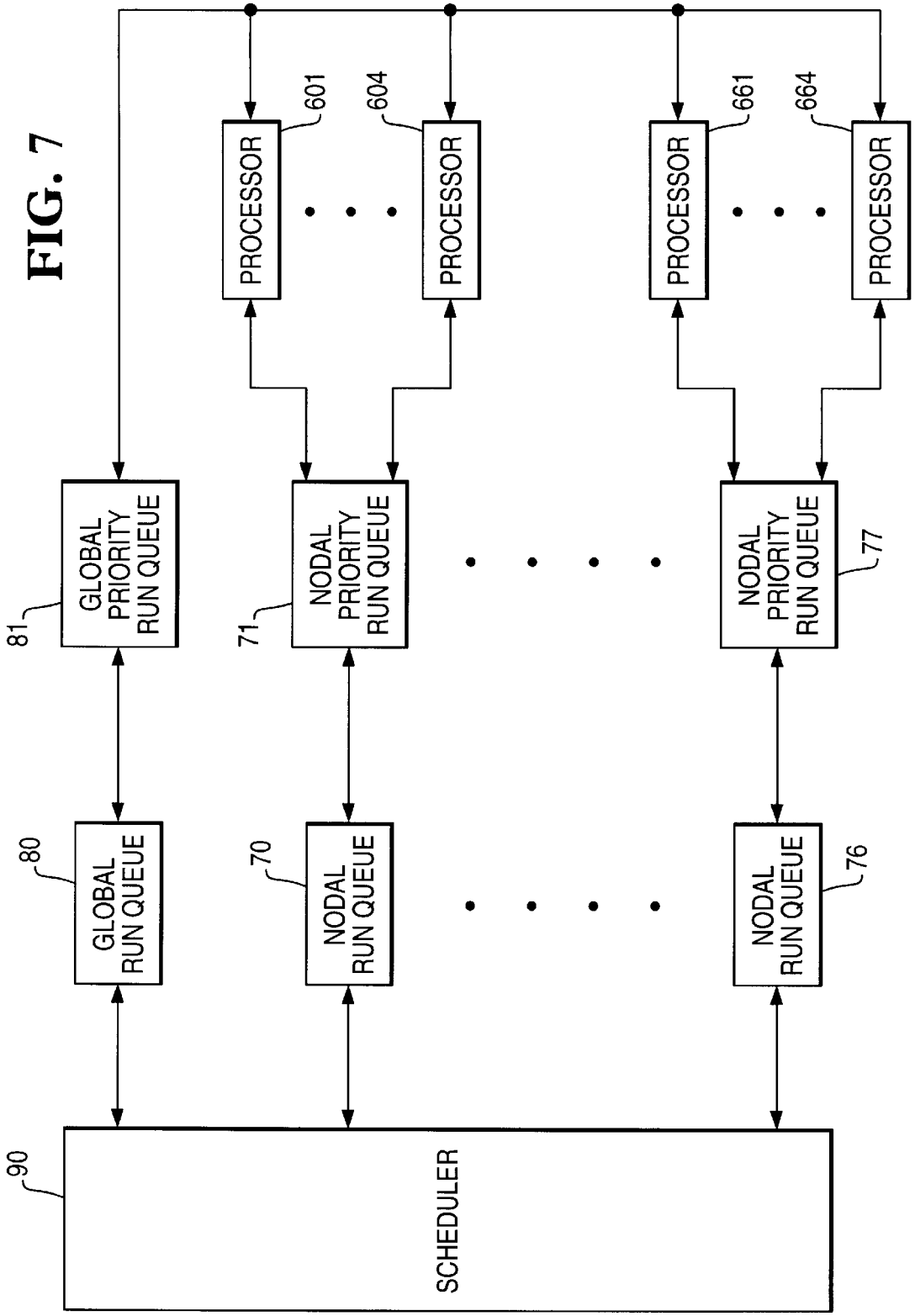
FIG. 7 is a simplified block diagram illustrating the major elements of an affinity scheduler utilized within the multi-processor system of FIGS. 5 and 6.

A block diagram illustrating the major elements of an affinity scheduler utilized within the system illustrated in FIGS. 5 and 6 is provided in FIG. 7. The affinity scheduler system shown in FIG. 7 includes a nodal run queue 70 through 76 for each processor node in addition to the global run queue 80. Scheduler 90 schedules new processes in global run queue 80. Previously run processes are written to the nodal run queue associated with the processors to which processes are affinitized. For example, a process affinitized to processor 601 will be scheduled in nodal run queue 70, and a process affinitized to processor 664 will be scheduled in nodal run queue 76. However a process having no affinity is scheduled in global run queue 80. These processes may thereafter be reordered based upon process priority within a nodal priority run queues 71 and 77 and global priority run queue 81, respectively. Within priority levels processes are placed within their queues in a first-in-first-out (FIFO) order.

During operation, each processor, when it becomes available, will consult the global priority run queue and the nodal run queues to determine which process it will next execute. A method for scheduling processes within a multiple-node, multiprocessing system, such as the system illustrated in FIGS. 5 and 6 is disclosed in U.S. patent application Ser. No. 08/508,017, titled "CACHE AFFINITY SCHEDULING METHOD FOR MULTI-PROCESSOR NODES IN A SPLIT TRANSACTION BUS ARCHITECTURE," by Todd C. Davis. U.S. patent application Ser. No. 08/508,017, filed on Jul. 7, 1995, and assigned to the assignee of the present application, is hereby incorporated by reference.

The enhanced affinity scheduler discussed earlier can be employed within the system shown in FIGS. 5 through 7 to reassign frequently communicating processes to the same processor or to different processors residing on the same processor node. Reassigning frequently communicating processes to different processors residing on the same processor node reduces system or memory bus transactions but also realizes the performance advantages provided by bus snooping and cache sharing utilized by the small number of tightly-coupled processors residing on the same processor node or Quad board.

It can thus be seen that there has been provided by the present invention a new and useful scheduling facility for a multiprocessor system which assigns frequently communicating processes to the same processor or processor node to eliminate locking and cache inefficiencies normally resulting from the use of a sleep/wakeup facility.

Although the presently preferred embodiment of the invention has been described, it will be understood that various changes may be made within the scope of the appended claims.

What is claimed is:

1. In a computer system including a plurality of processors and employing a sleep/wakeup facility whereby a first process requiring information from a second process is placed into a "sleep" state by said computer system until said second process is able to provide said required information, said first process thereupon being awakened by said computer system so that said first process may continue processing with the required information, a method for assigning processes to processors within said multiprocessor computer system for execution, said method comprising the steps of:

identifying a pair of processes which frequently exchange wakeup requests; and assigning the processes within said pair of processes to the same processor within said multi-processor computer system for execution.

2. The method in accordance with claim 1, wherein said step of identifying a pair of processes which frequently exchange wakeup requests comprises the steps of:

maintaining a record of each "wakeup" request issued by said computer system, said record including:
an identification of the process on whose behalf said wakeup request is issued; and
an identification of the process to which said wakeup request is issued;

determining from said records a count of the number of wakeup requests on behalf of a first process to a second process;

comparing said count to a predetermined threshold, said first and second processes being identified as a pair of processes which frequently exchange wakeup requests when said count exceeds said predetermined threshold.

3. In a computer system including a plurality of processors and employing a sleep/wakeup facility whereby a first process requiring information from a second process is placed into a "sleep" state by said computer system until said second process is able to provide said required information, said first process thereupon being awakened by said computer system so that said first process may continue processing with the required information, a method for scheduling process execution, said method comprising the steps of:

maintaining a record of each "wakeup" request issued by said computer system, said record including:
an identification of the process on whose behalf said wakeup request is issued; and
an identification of the process to which said wakeup request is issued;

examining said records to identify pairs of processes which frequently exchange wakeup requests;

assigning the processes within said pair of processes to the same processor within said multi-processor computer system for execution.

4. The method in accordance with claim 3, wherein said step of examining said records to identify pairs of processes which frequently exchange wakeup requests; comprises the steps of:

determining from said records a count of the number of wakeup requests on behalf of a first process to a second process;

comparing said count to a predetermined threshold, said first and second processes being identified as a pair of processes which frequently exchange wakeup requests when said count exceeds said predetermined threshold.

5. An improved process scheduling method for a multiprocessor computer system, the improvement comprising the step of:

assigning frequently communicating processes to the same processor within said multiprocessor system.

6. An improved process scheduling method for a multiprocessor computer system, said multiprocessor system including a plurality of processor nodes, each processor node including a plurality of tightly-coupled processors and cache memories associated therewith, the improvement comprising the step of:

assigning frequently communicating processes to the same processor node within said multiprocessor system.

7. In a computer system including a plurality of processor nodes, each processor node including a plurality of tightly-coupled processors and cache memories associated therewith, and employing a sleep/wakeup facility whereby a first process requiring information from a second process is placed into a "sleep" state by said computer system until said second process is able to provide said required information, said first process thereupon being awakened by said computer system so that said first process may continue processing with the required information, a method for scheduling process execution, said method comprising the steps of:

maintaining a record of each "wakeup" request issued by said computer system, said record including:
an identification of the process on whose behalf said wakeup request is issued; and
an identification of the process to which said wakeup request is issued;

examining said records to identify pairs of processes which frequently exchange wakeup requests;

assigning the processes within said pair of processes to the same processor node within said multi-processor computer system for execution.

8. The method in accordance with claim 3, wherein said step of examining said records to identify pairs of processes which frequently exchange wakeup requests; comprises the steps of:

determining from said records a count of the number of wakeup requests on behalf of a first process to a second process;

comparing said count to a predetermined threshold, said first and second processes being identified as a pair of processes which frequently exchange wakeup requests when said count exceeds said predetermined threshold.

* * * * *